US011750074B2

United States Patent
Ma et al.

(10) Patent No.: US 11,750,074 B2
(45) Date of Patent: Sep. 5, 2023

(54) LINEAR VIBRATION MOTOR WITH ELASTIC MEMBER AND FLEXIBLE PCB FIXED ON A FIXING MEMBER VIA POSITIONING HOLES

(71) Applicant: AAC Microtech (Changzhou) Co., Ltd., Changzhou (CN)

(72) Inventors: Jie Ma, Shenzhen (CN); Lubin Mao, Shenzhen (CN); Kejia Liu, Shenzhen (CN); Zhiyong Cui, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 49 days.

(21) Appl. No.: 17/542,525

(22) Filed: Dec. 6, 2021

(65) Prior Publication Data
US 2022/0200427 A1 Jun. 23, 2022

(30) Foreign Application Priority Data

Dec. 22, 2020 (CN) .......................... 202023126605.5

(51) Int. Cl.
*H02K 33/02* (2006.01)
(52) U.S. Cl.
CPC .................................. *H02K 33/02* (2013.01)
(58) Field of Classification Search
CPC ........ H02K 33/00; H02K 33/02; H02K 33/16; H02K 35/02
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | |
|---|---|---|---|
| 10,160,010 B2* | 12/2018 | Chun | H02K 33/16 |
| 10,312,788 B2* | 6/2019 | Mao | H02K 5/225 |
| 10,468,957 B2* | 11/2019 | Zhu | H02K 33/16 |
| 10,674,278 B2* | 6/2020 | Zhou | H04R 9/025 |
| 10,847,296 B2* | 11/2020 | Wauke | H01F 7/126 |
| 2011/0266892 A1* | 11/2011 | Wauke | H02K 33/18 310/25 |
| 2013/0061736 A1* | 3/2013 | Wauke | G10H 1/42 84/736 |
| 2018/0062492 A1* | 3/2018 | Akanuma | H02K 33/16 |
| 2019/0151895 A1* | 5/2019 | Takahashi | H02K 33/18 |

FOREIGN PATENT DOCUMENTS

WO    WO-2019029055 A1 *  2/2019  ............ B06B 1/045

OTHER PUBLICATIONS

WO-2019029055-A1 English Translation.*

* cited by examiner

*Primary Examiner* — Maged M Almawri
(74) *Attorney, Agent, or Firm* — W&G Law Group

(57) ABSTRACT

The present disclosure discloses a linear motor including a housing with an accommodation space, a vibrator, a stator, an elastic member and a flexible printed circuit board; the vibrator includes an iron core with an axis direction, a coil wounded around the iron core and a fixing member fixed on the iron core; the flexible printed circuit board is fixed on the fixing member. The fixing member serves as a bridge between the coil and the flexible printed circuit board, thus improving the fixation stability between the coil and the flexible printed circuit board and effectively avoiding disconnection of the coil.

9 Claims, 10 Drawing Sheets

LINEAR VIBRATION MOTOR WITH ELASTIC MEMBER AND FLEXIBLE PCB FIXED ON A FIXING MEMBER VIA POSITIONING HOLES

FIELD OF THE PRESENT DISCLOSURE

The present disclosure relates to tactile feedback technologies, especially relates to a linear vibration motor applied in mobile device.

DESCRIPTION OF RELATED ART

With the development of electronic technologies, portable consumable electronic products are increasingly popular, such as mobile phone, hand-held game console, navigating device or hand-held multimedia entertainment equipment, in which a linear vibration motor is generally used for system feedback, such as call reminder, message reminder, navigation reminder of mobile phone, vibration feedback of game console.

A linear vibration motor of related art includes a housing, a vibrator, a stator, an elastic member and flexible printed circuit board. One of the vibrator and the stator includes a coil and the other includes a magnet. The elastic member suspends the vibrator in the housing. The flexible printed circuit board provides power supply for the coil to actuate the vibrator. However, in the related art, the coil directly connects with the flexible printed circuit board without any medium; the fixation stability between the flexible printed circuit board and the coil is not sufficient enough, thus resulting in the disconnection of the coil and lower reliability.

Therefore, it is necessary to provide an improved linear vibration motor to overcome the problems mentioned above.

SUMMARY OF THE INVENTION

The present disclosure provides a linear vibration motor with higher reliability.

The linear vibration motor includes a housing with an accommodation space, a vibrator received in the accommodation space, including an iron core with an axis direction, a coil wounded around the iron core and a fixing member fixed on the iron core, a stator fixed on the housing and configured to drive the vibrator to vibrate, an elastic member configured to suspend the vibrator in the accommodation space, and a flexible printed circuit board fixed on the fixing member and electrically connected with the coil.

Further, the iron core and the fixing member are integrated by injection molding.

Further, the fixing member includes a fastening portion fixed on the iron core and a positioning portion extending from the fastening part away from the iron core; the flexible printed circuit board is provided with a positioning hole penetrating through thereon for the positioning portion to pass there through.

Further, the iron core dents away from the coil to form a first notch; the fixing member further includes a connecting portion extending from the fastening portion and received in the first notch.

Further, the first notch is annular; the connecting portion is annular.

Further, the fixing member further includes an isolation portion extending from the connecting portion along the axis direction and received in the first notch; the vibrator further comprises a dielectric membrane sandwiched between the coil and the iron core; at least part of the isolation portion is wrapped by the dielectric membrane.

Further, the isolation portion is aligned with an outer surface of the iron core.

Further, the elastic member includes two elastic plates arranged on two opposite sides of the iron core along a first direction perpendicular with the axis direction, and a connecting plate connecting the two elastic plates; the connecting plate is located on one side of the iron core away from the flexible printed circuit board.

Further, the linear vibration motor includes a connecting frame arranged between the iron core and the elastic plate; the elastic plate and the fastening portion are both fixed on the connecting frame.

Further, the connecting frame is provided with a second notch; the fixing member further includes an extending portion extending from the fastening portion and received in the second notch.

Further, the fixing member further includes a supporting portion extending from the fastening portion towards an end surface of the iron core; the supporting portion is provided to support the iron core.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENTS

Figure 1:
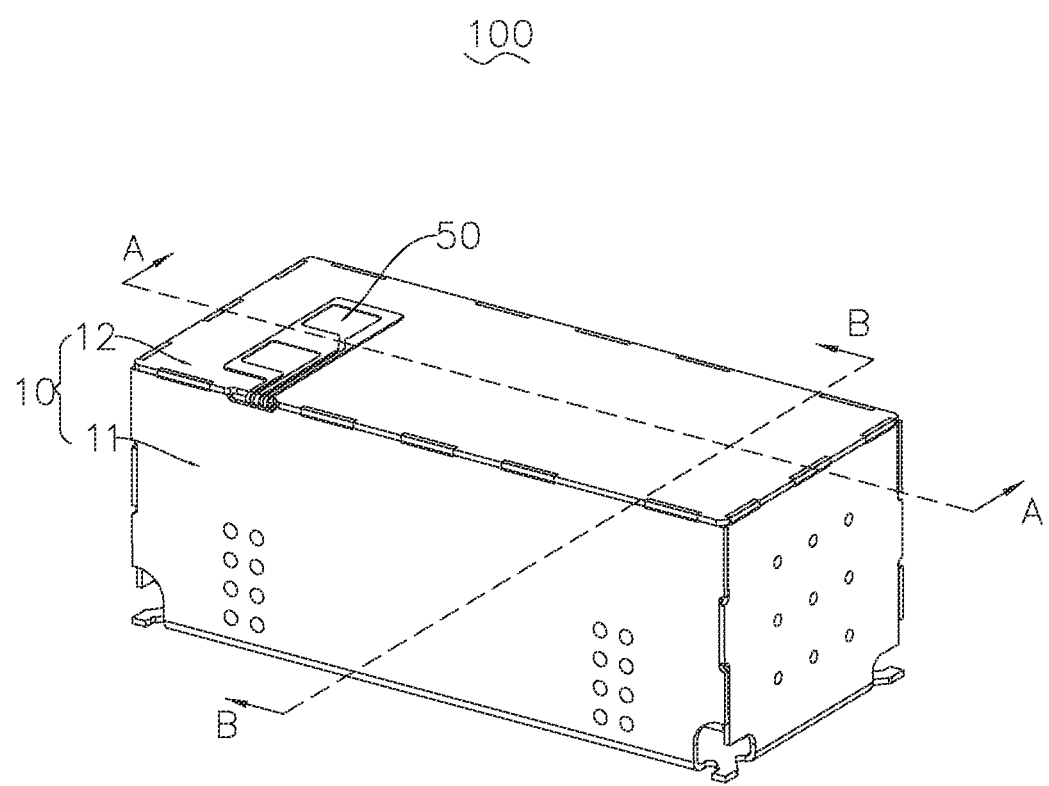
FIG. 1 is an isometric view of a linear vibration motor in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

It should be noted that the description of "first", "second" and the like in the present disclosure is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the various embodiments can be combined with each other, but it must be based on that it can be realized by ordinary technicians. When the combination of the technical solutions is contradictory or cannot be realized, it should be considered that the combination of the technical solutions does not exist, nor is it within the scope of protection required by the present disclosure.

Please refer to FIG. 1-FIG. 5 together, a linear vibration motor 100 provided by an exemplary embodiment of the present disclosure includes a housing 10 with an accommodation space 200, a vibrator 20 received in the accommodation space 200, an elastic member 40 configured to suspend the vibrator 20 in the accommodation space 200, and a stator 30 fixed on the housing 10 and configured to drive the vibrator 20 to vibrate. The vibrator 20 includes an iron core 21 with an axis direction, a coil 22 wounded around the iron core 21 and a fixing member 23 fixed on the iron core 21. The linear vibration motor 100 further includes a flexible printed circuit board 50 electrically connected with the coil 22. And the flexible printed circuit board 50 is fixed on the fixing member 23. It can be understood that the axis direction of the iron core 21 is along its length direction.

In one embodiment, the coil 22 is wounded around the iron core 21. The fixing member 23 is fixed on the iron core 21. It is indicated that the fixing member 23 is relatively static with the coil 21. Furthermore, the flexible printed circuit board 50 is fixed on the fixing member 23. Therefore, the flexible printed circuit board 50 is relatively static with the coil 22, thus improving the connection stability between the flexible printed circuit board 50 and the coil 22 and avoiding the disconnection of the coil 22. It should be noted that the fixing member 23 is made of plastic material to act as a dielectric medium between the coil 22 and the flexible printed circuit board 50.

Figure 2:
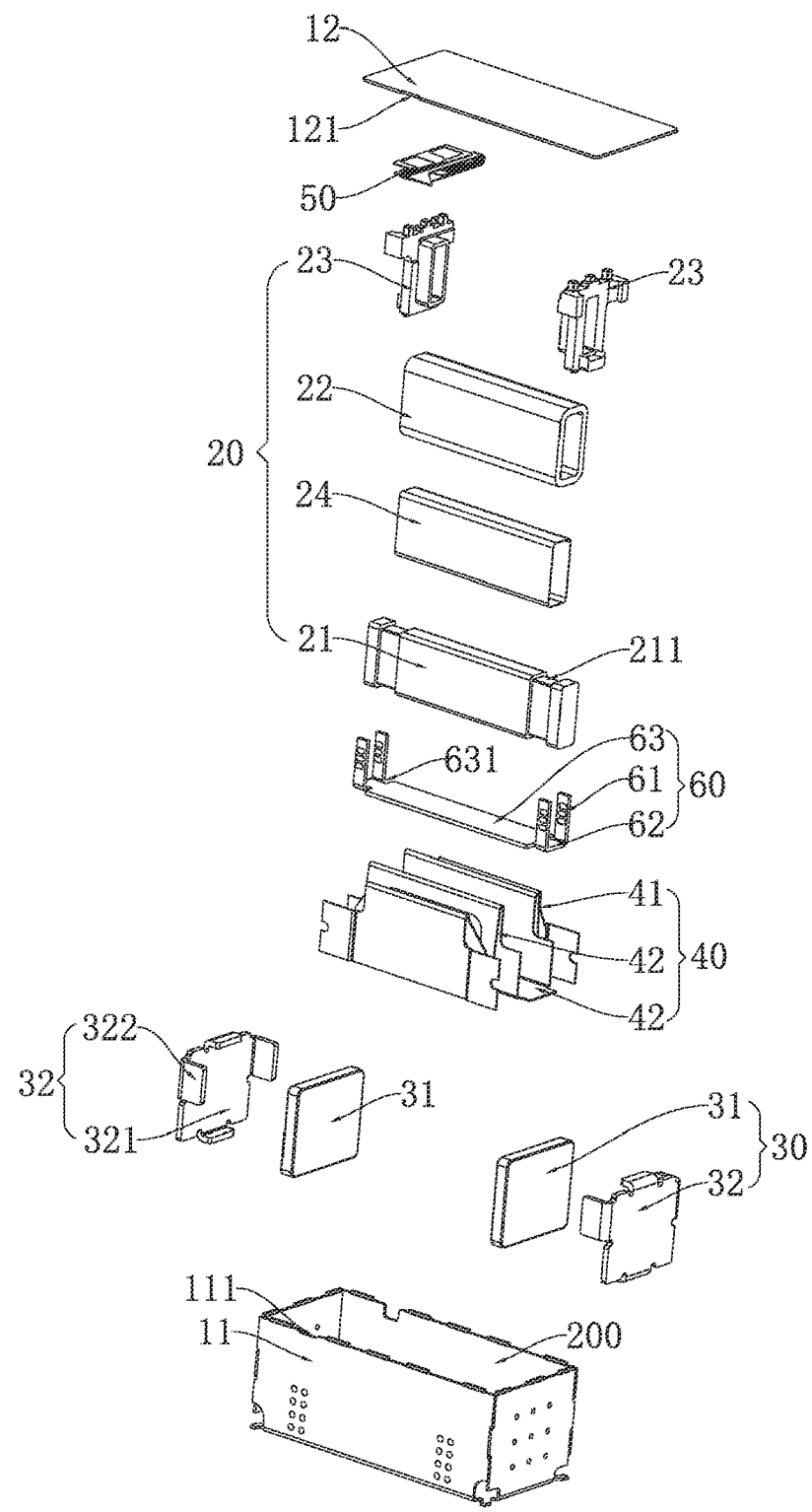
FIG. 2 is an exploded view of the linear vibration motor in FIG. 1.
Figure 8:
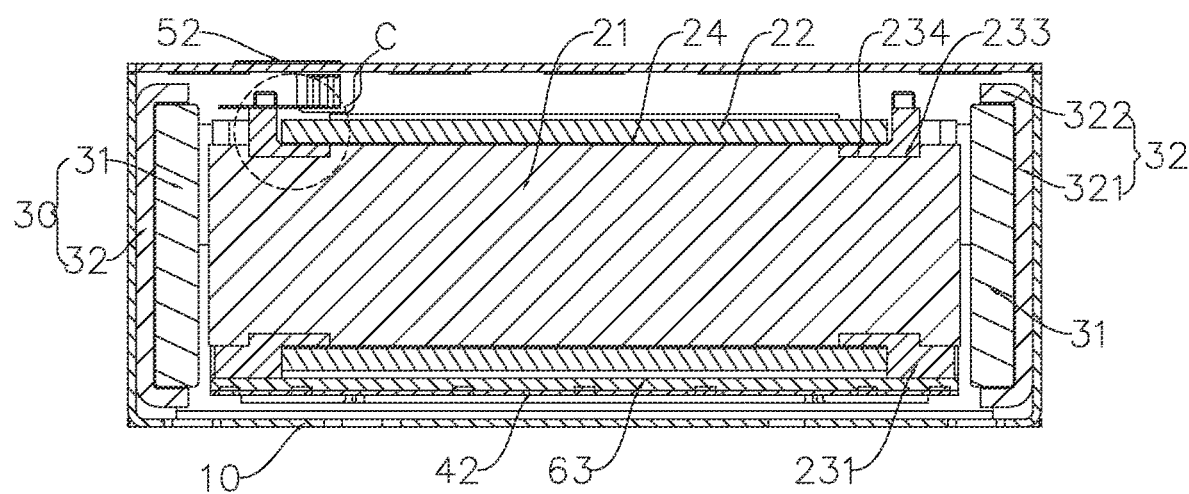
FIG. 8 is a cross-sectional view of the linear vibration motor taken along line A-A in FIG. 1.
Figure 9:
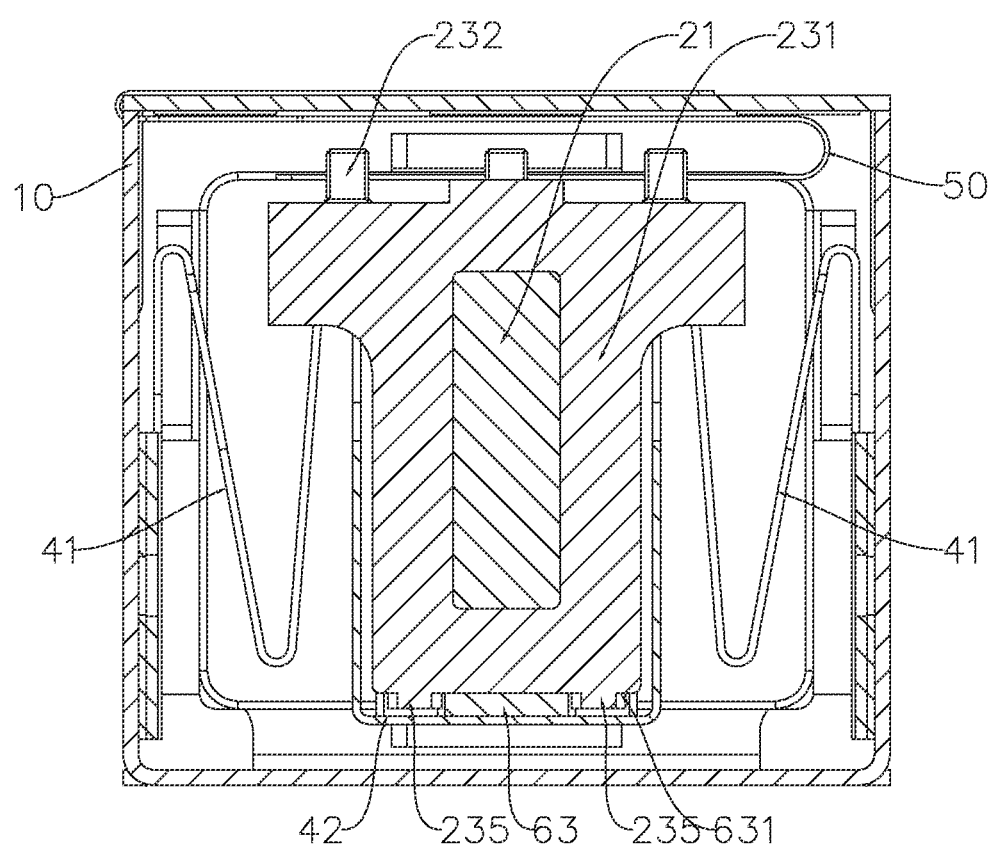
FIG. 9 is a cross-sectional view of the linear vibration motor taken along line B-B in FIG. 1.
Figure 10:
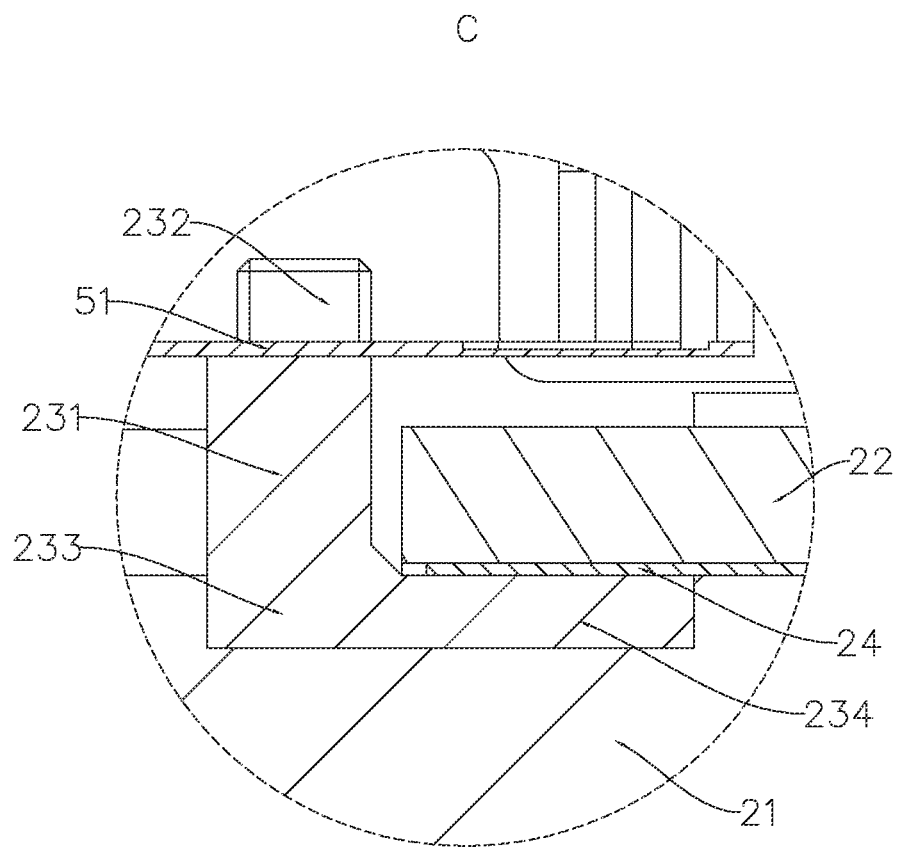
FIG. 10 is an enlarged view of part C shown in FIG. 8.

Please refer to FIG. 2 and FIG. 8, the stator 30 includes two magnets 31 arranged on two opposite sides of the iron core 21 along the axis direction. The magnet 31 is located opposite to the iron core 21. When the coil 22 is power on, a driven force is generated by the coil 22, magnet 31 and the iron core 21 to drive the vibrator 20.

In one embodiment, the stator 30 further includes a magnetic frame 32 fixed on the housing 10. The magnetic frame 32 includes a main plate 321 and plurality of side wall 322 bending from the main plate 321 and extending towards the magnet 31.

In one embodiment, the iron core 21 and the fixing member 23 are integrated by injection molding. The assembly process is simplified by omit the assembling the individual iron core and fixing member. In this way, the assembly efficiency and assembly precision are both improved.

Please refer to FIG. 5 and FIG. 7-FIG. 10, in one embodiment, The fixing member 23 includes a fastening portion 231 fixed on the iron core 21 and a positioning portion 232 extending from the fastening part 231 away from the iron core 21. The flexible printed circuit board 50 is provided with a positioning hole 511 penetrating through thereon. The positioning portion 232 passed through the positioning hole 511 so that the positioning portion 232 is sleeved on the flexible printed circuit board 50, forming a stable fixation between the fixing member 23 and the flexible printed circuit board 50. The fastening portion 231 is fixed on the iron core 21, forming a stable fixation between the fixing member 23 and the iron core 21.

In one embodiment, the iron core 21 dents away from the coil 22 to form a first notch 211. The fixing member 23 further includes a connecting portion 233 extending from the fastening portion 231 and received in the first notch 211. In this way, the connection between the fixing member 23 and the iron core 21 is fastened, further ensuring the connection stability. Furthermore, the first notch 211 is annular; the connecting portion 233 is also annular correspondingly. With more connecting parts, the connection between the fixing member 23 and the iron core 21 is further fastened.

In one embodiment, the vibrator 20 further includes a dielectric membrane 24 sandwiched between the coil 22 and the iron core 21. So, the iron core 21 is insulated with the coil 21. When the connecting portion 233 extends into the first notch 211 of the iron core 21, the iron core 21 would not be totally wrapped by the dielectric membrane 23, resulting in poor insulation between the iron core 21 and the coil 22. To solve this problem, the fixing member 23 further includes an isolation portion 234 extending from the connecting portion 233 along the axis direction and received in the first notch 211 too. It can be understood that the isolation portion 234 extend towards a center of the iron core 21 along the axis direction. At least part of the isolation portion 234 is wrapped by the dielectric membrane 24. In this way, the iron core 21 is totally wrapped by the dielectric membrane 24, thus avoiding the undesired contact between the iron core 21 and the coil 22 and improving the reliability between the coil 22 and the iron core 21. Preferably, the isolation portion 234 is aligned with an outer surface of the iron core 21. In another word, the depth of the first notch 211 is equal with the thickness of the isolation portion 234.

Figure 3:
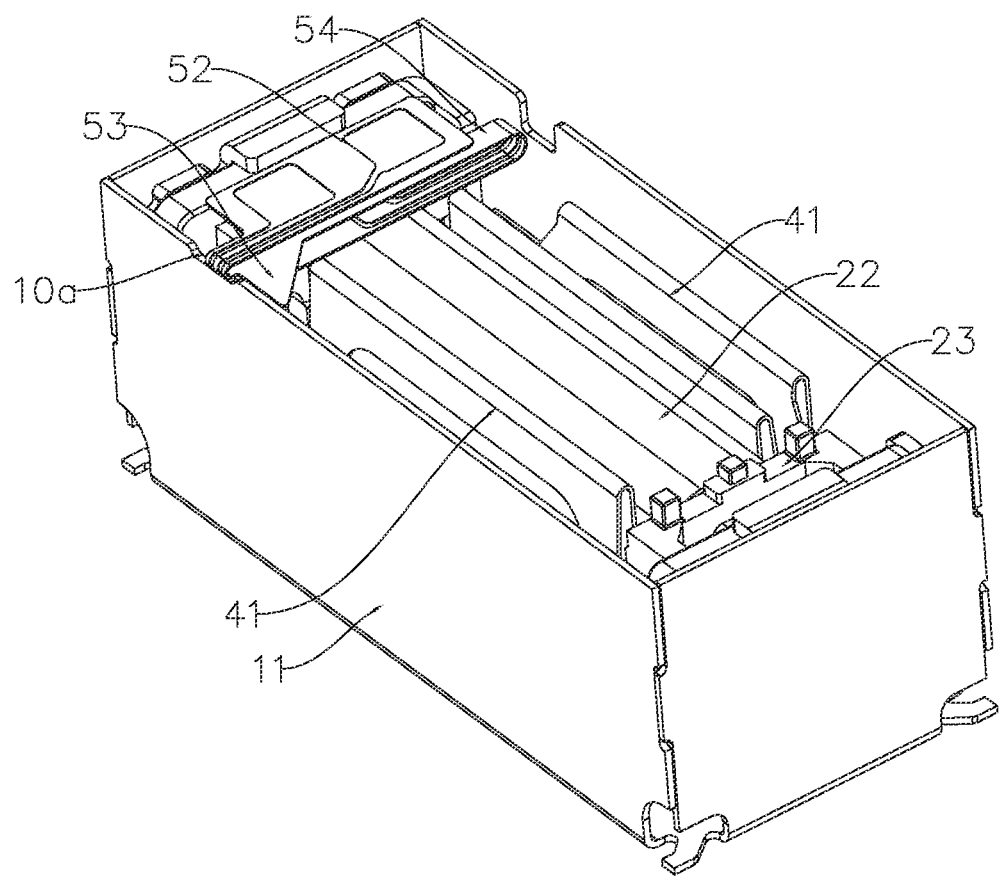
FIG. 3 is an isometric view of the linear vibration motor in FIG. 1 without a cover 12.
Figure 4:
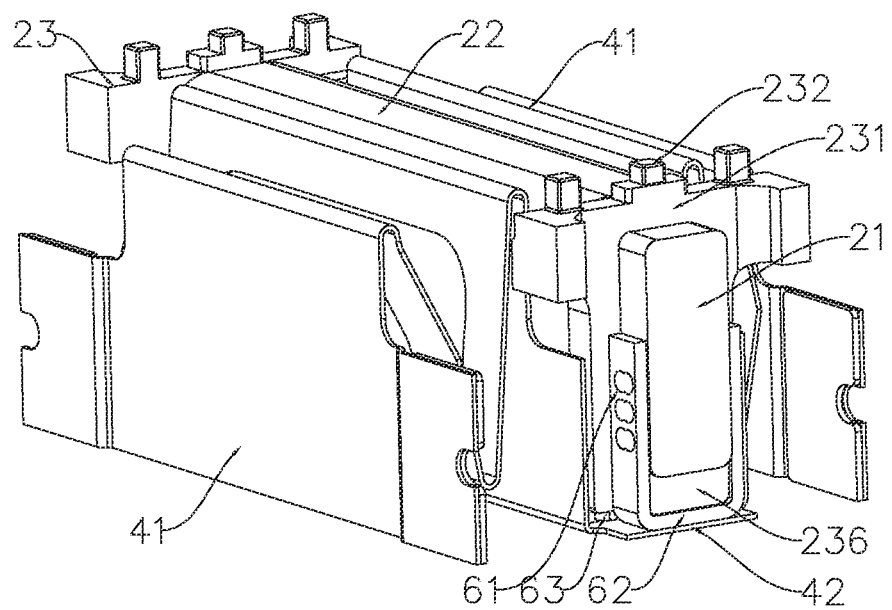
FIG. 4 is an isometric view of an assembly of a vibrator, a stator and a connecting frame of the linear vibration motor in FIG. 1.
Figure 5:
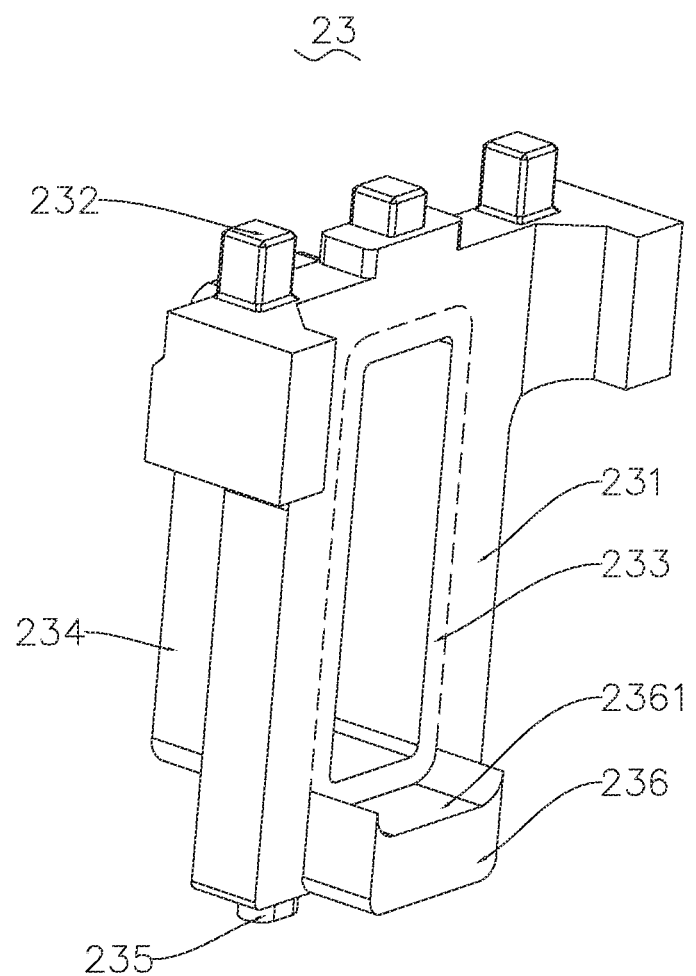
FIG. 5 is an isometric view of a fixing member of the linear vibration motor in FIG. 1.

Please refer to FIG. 2-FIG. 4, in one embodiment, the elastic member 40 includes two elastic plates 41 arranged on two opposite sides of the iron core 21 along a first direction perpendicular with the axis direction, and a connecting plate 42 connecting the two elastic plates 41. It can be understood that the two elastic plates 41 suspend the vibrator 20 to reciprocate along the first direction. So, the first direction is a vibration direction of the vibrator 20. The connecting plate 42 is located on one side of the iron core 21 away from the flexible printed circuit board 50. The linear vibration motor 100 further includes a connecting frame 60 arranged between the iron core 21 and the elastic plate 41. The connecting plate 42 is fixed on the connecting frame 60, and the fastening portion 231 is fixed with the connecting frame 60. That is to say, the stable fixation between the elastic member 40 and the iron core 21 attributes to the fixing member 23 and the connecting frame 60. The connecting frame 60 is made of material with high strength such as metal.

Figure 6:
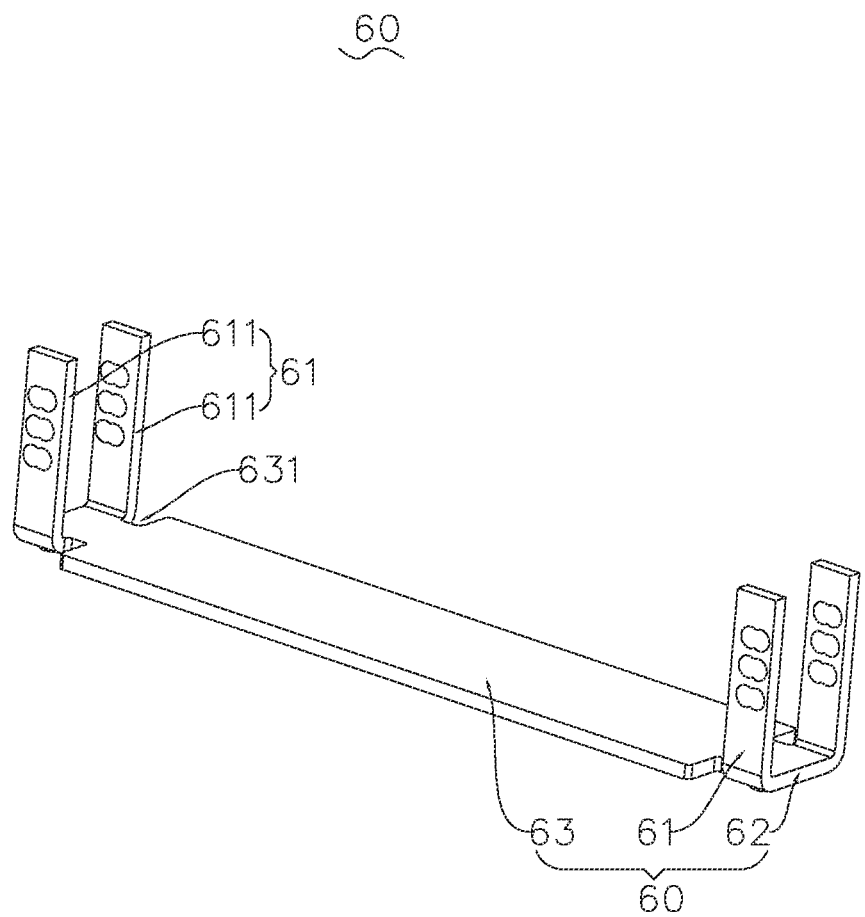
FIG. 6 is an isometric view of a connecting frame of the linear vibration motor in FIG. 1.

Please refer to FIG. 6, in one embodiment, the connecting frame 60 is provided with a second notch 631. The fixing member 23 includes an extending portion 235 extending from the fastening portion 231 and received in the second notch 631. The fixation between the second notch 631 and the extending portion 235 can realize the connection location of the connecting frame 60 and the fixing member 23, thus enhancing their the connection strength.

In one embodiment, the fixing member 23 further includes a supporting portion 236 extending from the fastening portion 231 towards an end surface of the iron core 21. The supporting portion 236 is provided to support the iron core 21, thus improving the stability between the fixing member 23 and the iron core 21 and also between the iron core 21 and the connecting frame 60.

In one embodiment, the supporting portion 236 is provided with a suspending notch 2361. The shape of the supporting notch 2361 corresponds to shape of the iron core 21 to obtain better match.

In one embodiment, the connecting frame 60 includes a first connecting portion 61 connected with the vibrator 20 and a second connecting portion 62 connected with the elastic member 40. The fixing member 23 is connected with the vibrator 20 via the first connecting portion 61 and the second connecting portion 62. Therefore, the elastic member 40 can be easily connected with vibrator 20 via connecting frame 60 without other additional components, thus simplifying the structure and the reducing the difficulty in manufacturing.

Specifically, the connecting frame 60 includes two first connecting portions 61 and two second connecting portion 62; the two first connecting portions 61 are arranged on two opposite ends of the iron core 21 along the axis direction, respectively; the two second connecting portions 62 are arranged on two opposite ends of the elastic member 40, respectively. Therefore, the connection stability between the elastic member 40 and the iron core 21 is enhanced.

In one embodiment, to further improve the connection reliability between the elastic member 40 and the iron core 21, the first connecting portion 61 includes two connecting arms 611 arranged on the two opposite sides of the iron core 21 along the first direction, respectively. The second connecting portion 62 connects the two connecting arms 611. Furthermore, the second connecting portion 62 is fixed with the connecting plate 42 of the elastic member 40. It can be understood that the supporting portion 236 is located between the iron core 21 and the second connecting portion 62.

Preferably, the connecting arm 611 and the second connecting portion 62 are both U-shape, indicating that the second connecting portion 62 connects the same end of the two connecting arms 611. Moreover, two ends of the connecting arm 611 are fixed on the iron core 21 and the supporting portion 236 separately, further improving the connection stability among the connecting frame 60, the iron core 21 and the fixing member 23.

The connecting frame 60 further includes a third connecting portion 63 which connects the two second connecting portions 62. Thus, the integrity and the stability of the connecting frame 60 are effectively improved. And the third connecting portion 63 is connected with the connecting plate 42. Simultaneously, the connecting area between the elastic member 40 and the connecting frame 60 is increased. In detail, the fastening portion 231 is fixed with the third connecting portion 63 of the connecting frame 60; and the second notch 631 is provided on the third connecting portion 63.

In one embodiment, to achieve aesthetic assembly, the first connecting portion 61, the second connecting portion 62 and the supporting portion 236 are all aligned with an end surface of the iron core 21 along the axis direction.

Figure 7:
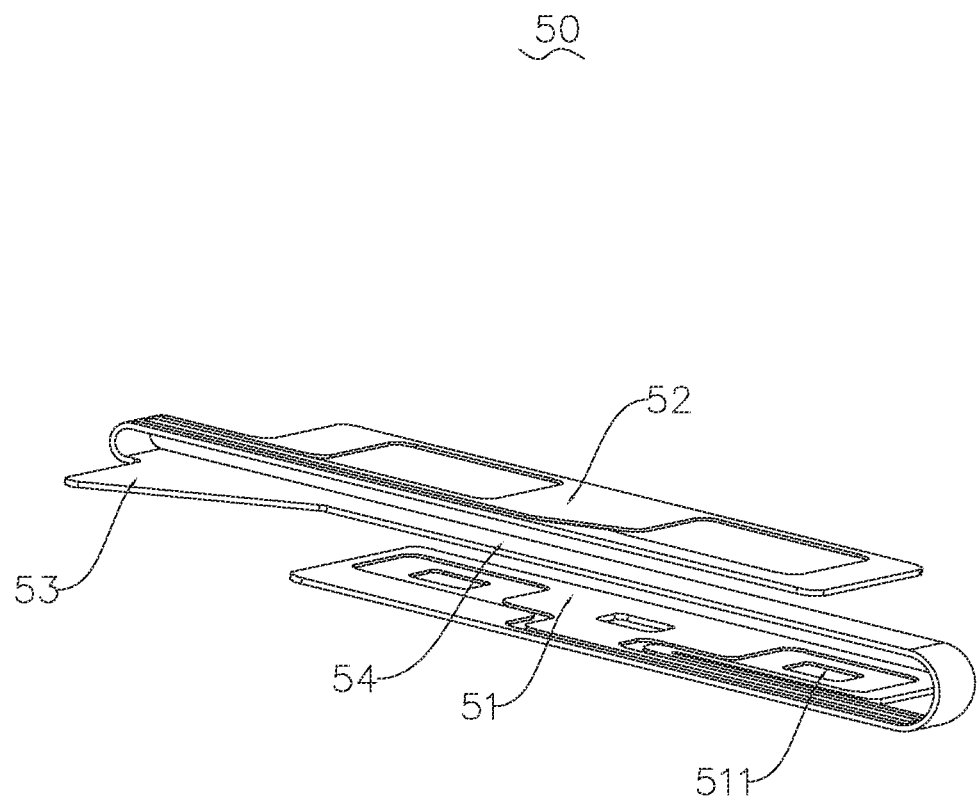
FIG. 7 is an isometric view of a flexible printed circuit board of the linear vibration motor in FIG. 1.

Please refer to FIG. 7, the flexible printed circuit board 50 includes a first conduction portion 51 inside the housing 10, a second conduction portion 52 outside the housing 10, and a third conduction portion 53 connecting the first conduction portion 51 and the second conduction portion 52. The first conduction portion 51 is electrically connected with the coil 22. The second conduction portion 52 is electrically connected with an external power supply.

In one embodiment, a through hole 10a is provided on the housing 10. The second conduction portion 52 extends to outside of the housing 10 by the through hole 10a. The third conduction portion 53 is received in the housing 10. To control the extending length of the second conduction portion 52 outside the housing 10, the third conduction portion 53 is abutted to an inner surface of the housing 10. Further, the third conduction portion 53 is abutted to the inner surface which is closer to the through hole 10a. Thus, the assembly precision of the flexible printed circuit board 50 can be ensured.

The positioning hole 511 is provided on the first conduction portion 51 to ensure the connection stability between the first conduction portion 51 and the coil 22.

In one embodiment, the third conduction portion 53 is in a triangle shape, which is beneficial for reducing the material cost of the flexible printed circuit board 50. Preferably, the third conduction portion 53 is in a right-angled triangle shape.

In one embodiment, the third conduction portion 53 is parallel to the first conduction portion 51. The flexible printed circuit board 50 further includes a bending portion 54 connecting the first conduction portion 51 and the second conduction portion 52. The bending portion 54 passing through the through hole 10a, realizes flexible connection between the first conduction portion 51 and the second conduction portion 52.

The third conduction portion 53 is located on one side of the bending portion 54 away from the first conduction portion 51. That is to say, the third conduction portion 53 and the first conduction portion are arranged on two opposite sides of the bending portion 54 separately, thus balancing a traction force acted on the first conduction portion 51. In other embodiments, two third conduction portions 53 are included, which are arranged on two sides of the bending portion 54. Or, the third conduction portion 53 is located on one side of the bending portion 54 closer to the first conduction portion 51.

In one embodiment, the first conduction portion 51 is parallel to or perpendicular with the second conduction portion 52.

In one embodiment, the housing 10 includes a shell 11 with an opening and a cover 12 covering the opening. A first hole 111 is provided on the shell 11 and a second hole 121 is provided on the cover 12. The through hole 10a is formed by the first hole 111 and the second hole 112. The second conduction portion 52 is fixed on the cover 12; the third conduction portion 53 is abutted to an inner surface of the shell 11.

Compared with the related art, in the embodiment of the present disclosure, the linear vibration motor includes a fixing member fixed on the iron core and serving as a bridge between the coil and the flexible printed circuit board, thus improving the fixation stability between the coil and the flexible printed circuit board, effectively avoiding disconnection of the coil and improving the reliability of the linear vibration motor. And the isolation portion of the fixing member ensures the dielectric reliability between the coil and the iron core.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
a housing with an accommodation space;
a vibrator received in the accommodation space, comprising an iron core with an axis direction, a coil wounded around the iron core and a fixing member fixed on the iron core;
a stator fixed on the housing and configured to drive the vibrator to vibrate;
an elastic member configured to suspend the vibrator in the accommodation space; and
a flexible printed circuit board fixed on the fixing member and electrically connected with the coil;
the iron core and the fixing member are integrated by injection molding;
the fixing member comprises a fastening portion fixed on the iron core and a positioning portion extending from the fastening part away from the iron core; the flexible printed circuit board is provided with a positioning hole penetrating through thereon for the positioning portion to pass there through.

2. The linear vibration motor as described in claim 1, wherein the iron core dents away from the coil to form a first notch; the fixing member further comprises a connecting portion extending from the fastening portion and received in the first notch.

3. The linear vibration motor as described in claim 2, wherein the first notch is annular; the connecting portion is annular.

4. The linear vibration motor as described in claim 2, wherein the fixing member further comprises an isolation portion extending from the connecting portion along the axis direction and received in the first notch; the vibrator further comprises a dielectric membrane sandwiched between the coil and the iron core; at least part of the isolation portion is wrapped by the dielectric membrane.

5. The linear vibration motor as described in claim 4, wherein the isolation portion is aligned with an outer surface of the iron core.

6. The linear vibration motor as described in claim 2, wherein the elastic member comprises two elastic plates arranged on two opposite sides of the iron core along a first direction perpendicular with the axis direction, and a connecting plate connecting the two elastic plates; the connecting plate is located on one side of the iron core away from the flexible printed circuit board.

7. The linear vibration motor as described in claim 6, further comprising a connecting frame arranged between the iron core and the elastic plate; wherein the elastic plate and the fastening portion are both fixed on the connecting frame.

8. The linear vibration motor as described in claim 7, wherein the connecting frame is provided with a second notch; the fixing member further comprises an extending portion extending from the fastening portion and received in the second notch.

9. The linear vibration motor as described in claim 7, wherein the fixing member further comprises a supporting portion extending from the fastening portion towards an end surface of the iron core; the supporting portion is provided to support the iron core.

* * * * *